US006427305B1

(12) United States Patent
Graham et al.

(10) Patent No.: US 6,427,305 B1
(45) Date of Patent: Aug. 6, 2002

(54) PART ELEVATOR HAVING A TRANSFER BAR WITH CAM FOLLOWER AND SLOT

(75) Inventors: John Graham, Clinton Township; Robert B. Raible, Ortonville; Johann S. Klimach, Clinton Township, all of MI (US)

(73) Assignee: Ex-Cello Machine Tools, Inc., Sterling Heights, MI (US)

( * ) Notice: Subject to any disclaimer, the term of this patent is extended or adjusted under 35 U.S.C. 154(b) by 0 days.

(21) Appl. No.: 09/422,538

(22) Filed: Oct. 21, 1999

(51) Int. Cl.[7] .............................................. B65G 49/02
(52) U.S. Cl. .................................. 29/346.3; 198/468.8
(58) Field of Search ....................... 198/346.3, 468.6, 198/750.875, 750.14, 774.3, 774.4

(56) References Cited

U.S. PATENT DOCUMENTS

| | | | |
|---|---|---|---|
| 2,826,288 A | * 3/1958 | Giaier | 198/346.3 X |
| 2,983,360 A | * 5/1961 | David | 198/346.3 |
| 3,193,121 A | * 7/1965 | Kumpf et al. | 198/346.3 |
| 3,735,852 A | * 5/1973 | O'Keefe | 198/774.4 X |
| 3,741,023 A | 6/1973 | Goebel et al. | |
| 4,121,697 A | 10/1978 | Kobelt et al. | |
| 4,285,457 A | * 8/1981 | Kondo | 198/346.3 X |
| 4,524,630 A | 6/1985 | Toth et al. | |
| 5,038,920 A | * 8/1991 | Nelson | 198/774.4 |
| 5,058,251 A | 10/1991 | Jones | |
| 5,125,307 A | 6/1992 | Jackson | |
| 5,492,214 A | * 2/1996 | Keith | 198/774.4 X |
| 5,586,464 A | 12/1996 | Horde | |
| 5,655,646 A | * 8/1997 | Soderlund et al. | 198/468.8 X |
| 5,788,306 A | 8/1998 | DiBiagio et al. | |

* cited by examiner

Primary Examiner—James R. Bidwell
(74) Attorney, Agent, or Firm—Wood, Herron & Evans LLP

(57) ABSTRACT

An apparatus for elevating a workpiece includes a transfer bar movable between a first position and a second position, and a support member having a cam surface with a first end and a second end. The cam follower is engageable with the cam surface for supporting the transfer bar with respect to the support member as the cam follower moves along the cam surface between the first end and the second end. When the transfer bar is in the first position, the cam follower is adjacent the first end of the cam surface. When the transfer bar is in the second position, the cam follower is adjacent the second end of the cam surface. A driving mechanism is provided for moving one of the cam follower and the cam surface relative to one another between the first end and the second end of the cam surface. The elevating apparatus can be used in a multi-station machining line where at least one workpiece to be machined is transported on at least one transfer bar from one station to another. The transfer bar is elevated to a first position for transportation of the workpiece between the stations, and is lowered to a second position when the workpiece reaches a station.

20 Claims, 5 Drawing Sheets

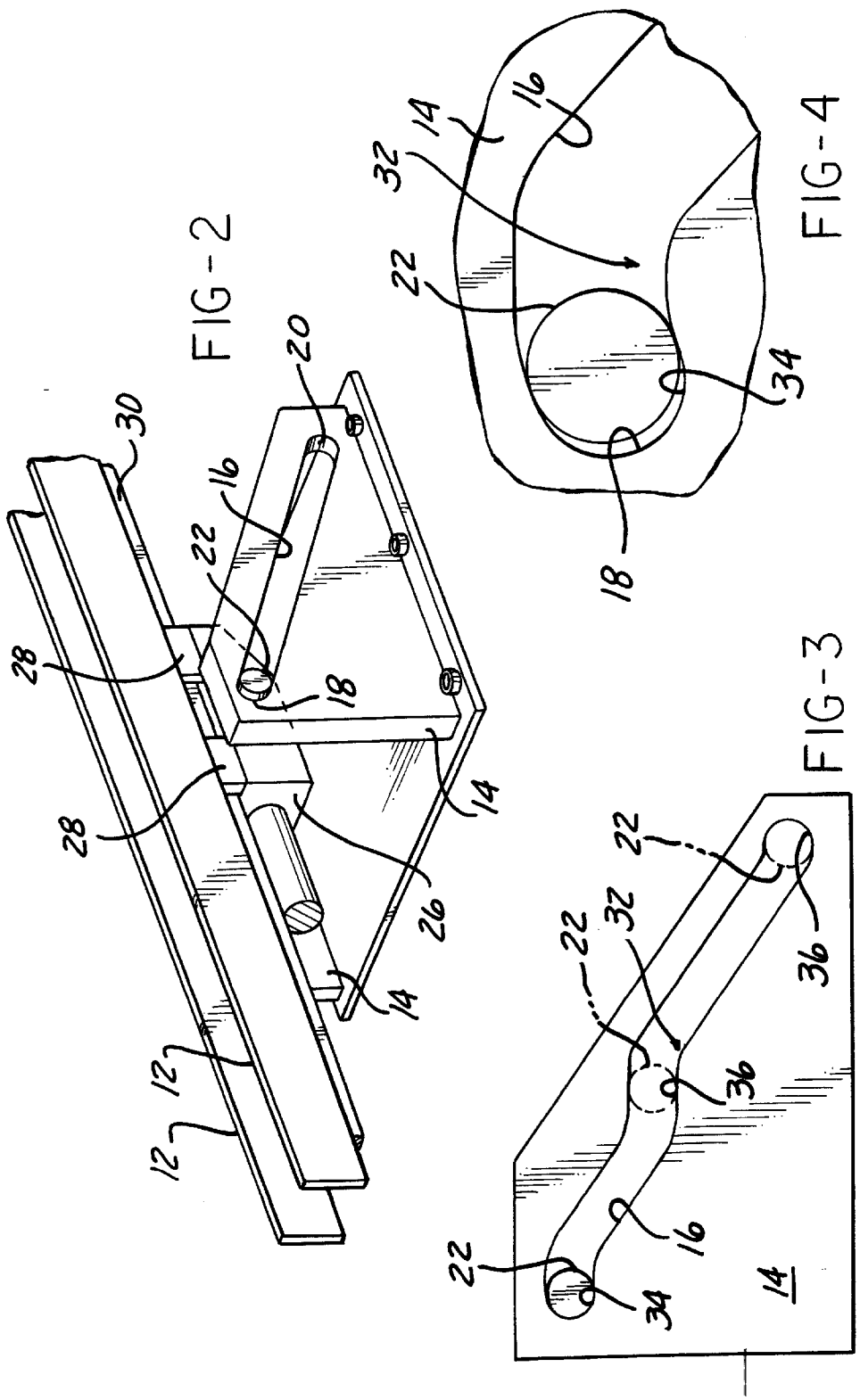

PART ELEVATOR HAVING A TRANSFER BAR WITH CAM FOLLOWER AND SLOT

FIELD OF THE INVENTION

The invention relates to a transfer bar lift apparatus for use with systems requiring a vertical lift capability to move a workpiece between a first position and a second position, such as with a lift and carry transfer machine.

BACKGROUND OF THE INVENTION

Transfer bar lift devices typically are used in machining operations where there are a number of stations between which a workpiece is cycled in order to receive different machining operations at each station. The workpiece can be moved directly by the transfer bar, or the workpiece can be secured to a pallet which is moved by the transfer bar. In either case, the workpiece is supported by the transfer bar and the transfer bar moves forward a prescribed distance during each step between the stations. Usually, the transfer bar is configured as two members in side-by-side relation to one another. When the transfer bar finishes the horizontal motion, the workpiece is placed in a stationary fixture which supports the workpiece for machining operations, or as a temporary transfer fixture for further movement along the path of travel. Before the transfer bar moves horizontally, it is raised vertically to lift the workpiece from the fixture prior to horizontal transportation. The lifting motion for the transfer bar is typically accomplished by lift arms and typically requires a distance of approximately seven inches for sufficient clearance for the horizontal movement.

Presently known lift devices require complex lift arm linkage mechanisms in order to operate properly. These devices and the numerous pivoting connections required for proper operation are subject to wear and failure problems when used in typical industrial environments. It would be desirable to provide a simplified lift device having fewer pivoting joints. It would be desirable to provide a lift apparatus where the prime mover, such as a motor or actuator, can be positioned in a location less prone to contamination and processing byproduct infiltration into the movement mechanism. It would be desirable to provide a lift apparatus capable of being configured with a variety of lift distances and lift motions without substantial changes to the actuator mechanism. It would be desirable to provide a lift apparatus having the capability of incorporating at least one dwell position and/or at least one detent or fail safe lock position. It would be desirable to provide a lift apparatus that could be mounted entirely on top of the machine bases to allow for future "above floor coolant systems".

SUMMARY OF THE INVENTION

The present invention provides a lifting mechanism having a cam surface and cam follower, such as a cam and slot configuration. The cam surface or slot can be formed in a wide variety of configurations to provide the lifting force to a transfer bar when driven in a horizontal direction by an actuator. The lift mechanism requires less horsepower, less space, and is easier to service and replace than previous configurations. The drive mechanism is not located in the area prone to contamination from work station processing. In addition, the cam surface or slot can potentially be configured into a cradle position eliminating the need for a separate locking pin to hold the elevator transfer bar in the raised position. The cam surface or slot generally extends along an inclined path with a cam follower disposed in operable engagement with the cam surface in order to move the transfer bar vertically between raised and lowered positions as the cam follower moves between a first end limit of travel and a second end limit of travel. Alternative configurations can be provided to the shape and contour of the cam surface or slot in order to provide a self-locking rest position in the upper and/or lower positions, and/or at least one intermediate dwell position or the like.

An apparatus for elevating a part according to the present invention includes a transfer bar movable between a first position and a second position. A support member is provided having a cam surface with a first end and a second end. A cam follower is engageable with the cam surface and supports the transfer bar with respect to the support member. The cam follower is movable between the first end and the second end of the cam surface, so that the transfer bar is in the first position when the cam follower is adjacent the first end of the cam surface, and the transfer bar is in the second position when the cam follower is adjacent the second end of the cam surface. Means is provided for driving the cam follower between the first and second ends of the cam surface. The driving means can include any suitable prime mover, such as a motor, or actuator, either electric, hydraulic, or pneumatic, or other suitable substitute. The cam surface can include a non-linear surface portion. The non-linear surface portion can include a cradle position, or a lock position, and/or one or more intermediate dwell positions or the like.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a perspective view of a portion of a part elevator apparatus according to the present invention;

FIG. 3 is an alternative configuration illustrating a dwell portion and lock portion along a length of the cam surface or slot according to the present invention;

FIG. 4 is a detail view of a cradle or lock position at one end of the cam surface or slot according to the present invention.

DETAILED DESCRIPTION OF THE PREFERRED AND ALTERNATIVE EMBODIMENTS

Figure 1:
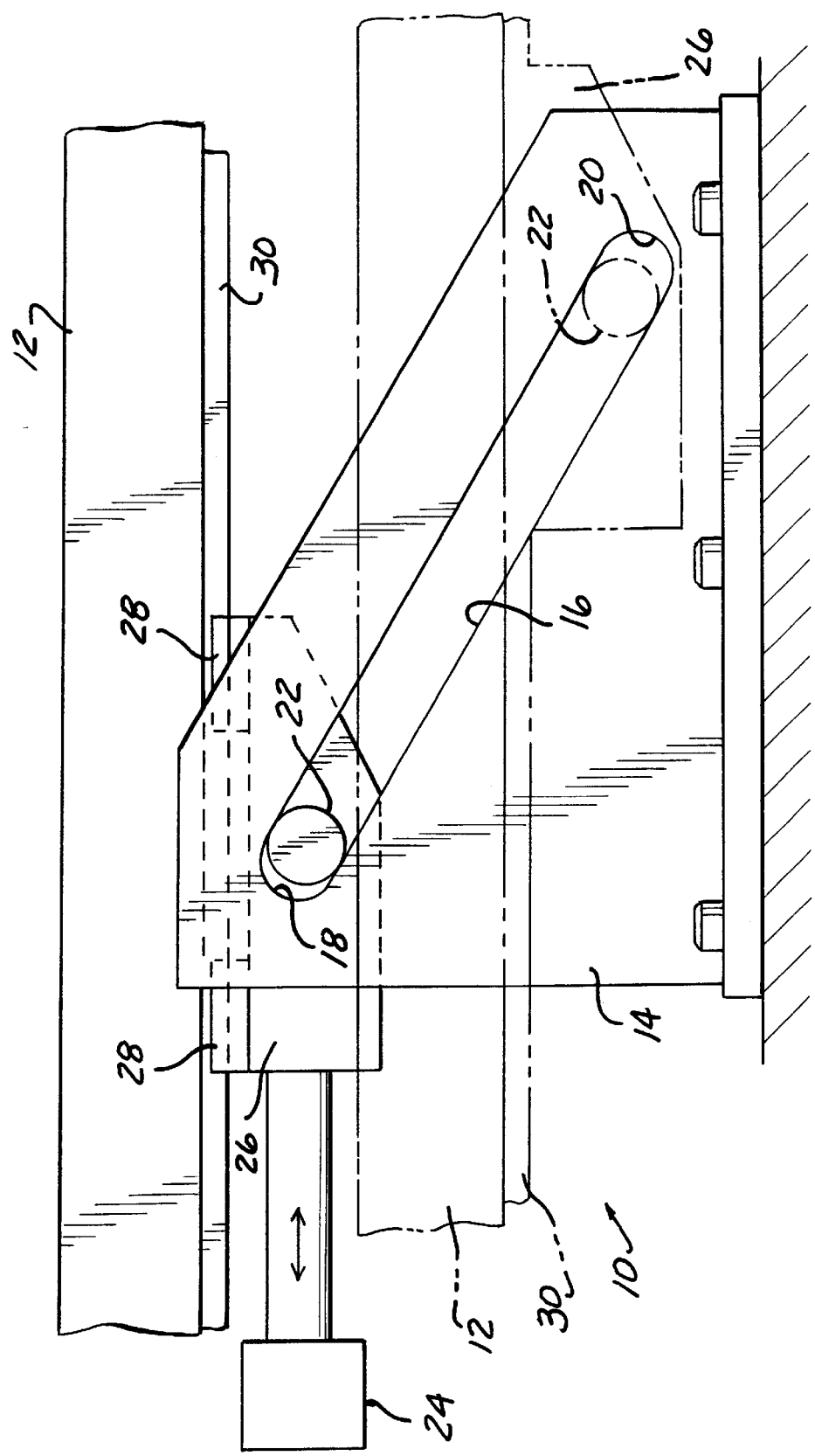
FIG. 1 is a side elevational view of a part elevator apparatus according to the present invention.

An apparatus 10 according to the present invention is provided for elevating a workpiece. By way of example and not limitation, this type of apparatus 10 is typically used in a multi-station machining line where at least one workpiece to be machined is transported on at least one transfer bar 12 from one station to another. The transfer bar 12 is elevated to a first position for transportation of the workpiece, and is lowered to a second position when the workpiece reaches a station. The first position is illustrated in solid line in FIG. 1, and the second position is illustrated in phantom line in FIG. 1. The transfer bar 12 is operably associated with a support member 14. The support member 14 includes a cam surface 16 with a first end 18 and a second end 20. A cam follower 22 is engageable with the cam surface 16 for supporting the transfer bar 12 with respect to the support member 14 as the cam follower 22 moves along the cam surface 16 between the first end 18 and the second end 20. In operation, the transfer bar 12 is in the first or raised position when the cam follower 22 is adjacent the first end 18 of the cam surface 16. The transfer bar 12 is in the second or lowered position when the cam follower 22 is adjacent the second end 20 of the cam surface 16. Means 24 is provided for driving the cam follower 22 between the first end 18 and second end 20 of the cam surface 16. The driving means 24 can include any suitable prime mover, such as an electric motor, hydraulic motor, pneumatic motor, hydraulic cylinder, pneumatic cylinder, or other suitable substitute. The prime mover can be directly connected to the lift truck or carriage 26 supporting the transfer bar 12 and cam follower 22, or can be indirectly connected through an appropriate mechanical connection to provide the desired reciprocal motion to be imparted to the carriage 26.

In operation, the driving means 24 is actuated to move the cam follower 22 along the cam surface 16. The driving means 24 acts on the lift truck or carriage 26 supporting the cam follower 22 and the transfer bar 12. Preferably, the lift truck or carriage 26 includes a slide block connection 28 to support one or more transfer bars 12 with respect to the lift truck or carriage 26. The slide block connections 28 slidably receive one or more rails 30 allowing horizontal movement of the one or more transfer bars 12 with respect to the lift truck or carriage 26. By way of example and not limitation, the transfer bar 12 can be moved horizontally while the lift truck or carriage 26 is in the raised position shown in solid lines in FIGS. 1 and 2. The lift truck or carriage 26 is held in the raised position by the driving means 24. When the horizontal movement of the transfer bar 12 has been completed, or as the movement approaches completion, the driving means 24 can be actuated to move the lift truck or carriage 26 from the raised position shown in solid line in FIG. 1 to the lowered position shown in phantom line in FIG. 1. During movement of the lift truck or carriage 26 by the driving means 24, the cam follower 22 operably engages and moves along the cam surface or slot 16 formed in the support member 14. If a straight vertical rise and fall of the workpiece is required in the particular application, the transfer bar 12 can be held in a stationary horizontal position as the lift truck or carriage 26 moves between the raised and lowered positions. Relative movement is permitted between the lift truck or carriage 26 and the transfer bar 12 through the slide block connections 28. When the lift truck or carriage 26 reaches the second or lowered position, the carried workpiece typically has been transferred to a work station nest or temporary workpiece transfer nest.

In some applications, it may be desirable to modify the movement, velocity or acceleration, of the workpiece as the workpiece travels between the first position and the second position. The cam surface 16 can include a non-linear surface portion 32, such as a cradle or lock surface portion 34 as illustrated in FIG. 4, or a dwell surface portion 36 as illustrated in FIG. 3. Referring to FIG. 3, the non-linear surface portion 32 of the cam surface 16 can include at least one dwell surface 36 to permit continued movement of the driving means 24 while maintaining the transfer bar in a stationary elevation, or in a reduced rate of vertical velocity or acceleration. In other words, the dwell surface portion 36 can bring the vertical velocity of the transfer bar 12 to a predetermined value, either greater than zero or equal to zero as desired for the particular application. One or more dwell surface portions 36 can be included along the length of the cam surface 16. The dwell surface portion 36 can be used individually or in combination with the cradle or lock surface portion 34 illustrated in detail in FIG. 4.

Referring now to FIG. 4, the cradle or lock surface portion 34 of the non-linear surface portion 32 can be used to maintain the transfer bar in a predetermined position in the event of a failure of the driving means 24. One or more cradle or lock surface portions 34 can be provided along the length of the cam surface 16 in various locations where it may be desired to hold the transfer bar in position in the event of a power failure to the driving means 24. The cradle or lock surface portion 34 can be used individually, or in combination with one or more dwell surface portions 36. One or more cradle or lock surface portions 34 can be provided along the length of the cam surface 16, or adjacent to at least one end of the cam surface 16.

Figure 5:
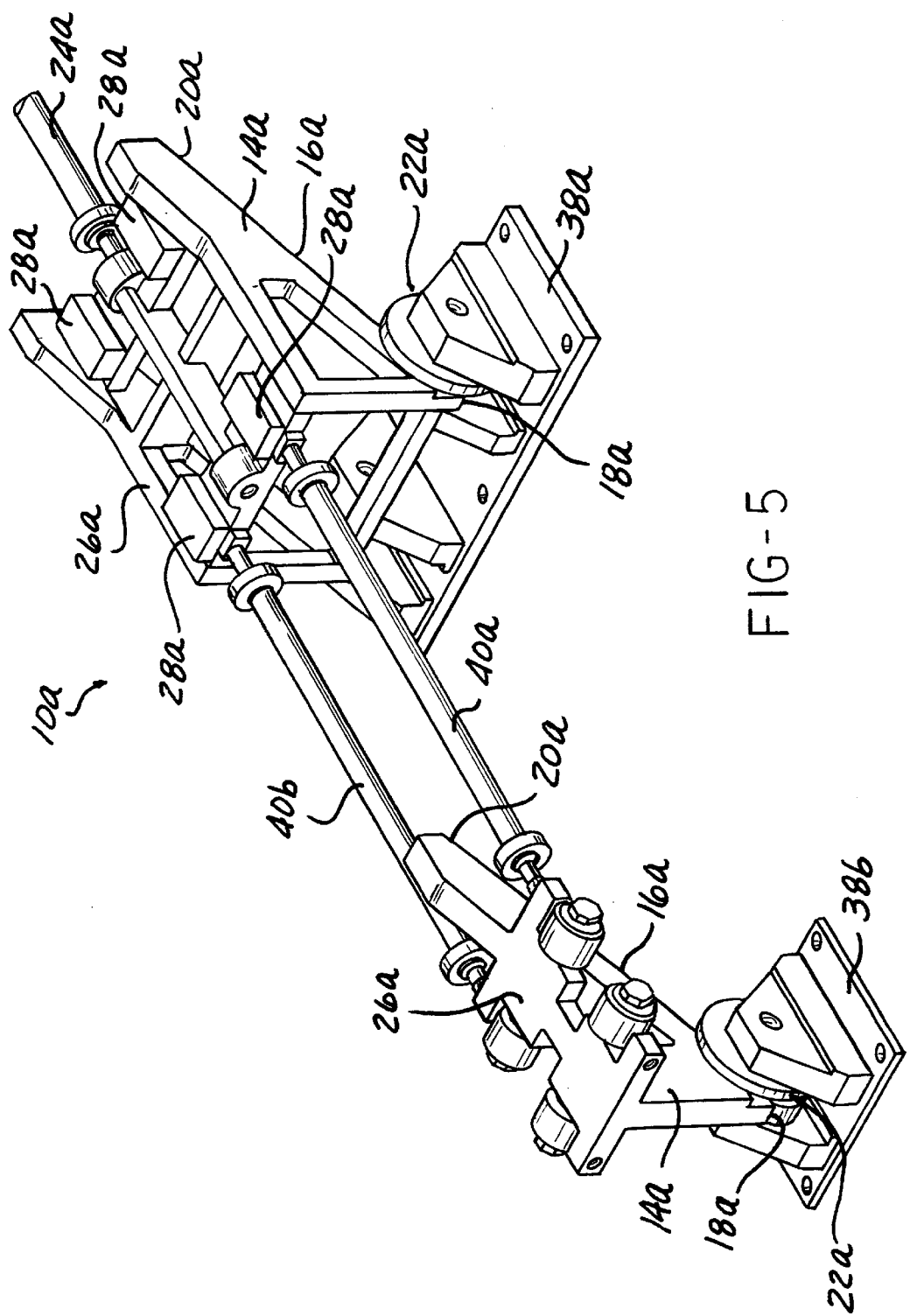
FIG. 5 is a perspective view of a portion of an alternative part elevator apparatus according to the present invention.
Figure 6:
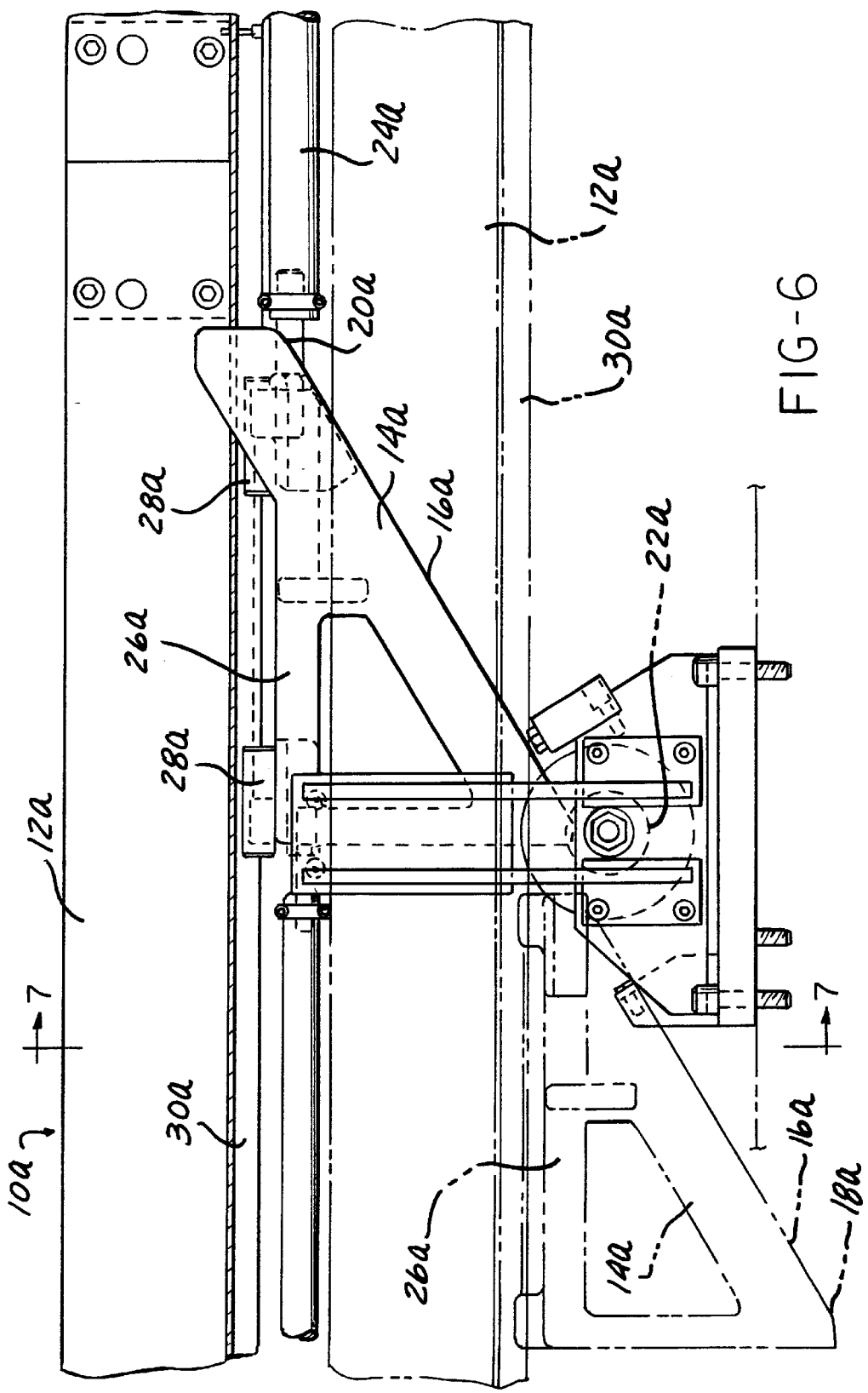
FIG. 6 is a side elevational view of a portion of the alternative part elevator apparatus illustrated in FIG. 5.
Figure 7:
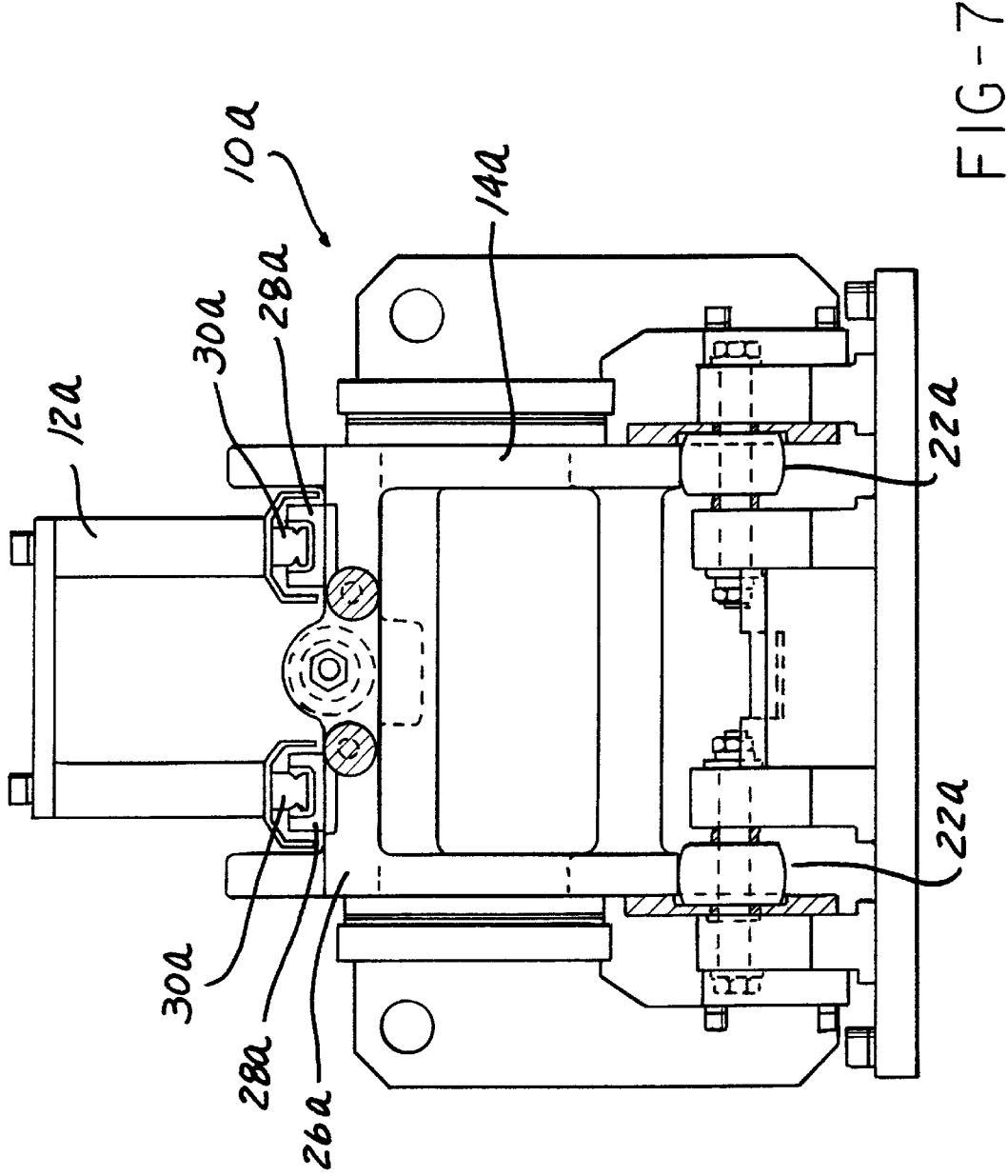
FIG. 7 is an end view of a portion of the alternative part elevator apparatus illustrated in FIG. 5.

Referring now to FIGS. 5–7, an alternative part elevator apparatus 10a can be provided for elevating a workpiece. By way of example and not limitation, this alternative type of apparatus 10a can also typically be used in a multi-station machine line where at least one workpiece to be machined is transported on at least one transfer bar 12a from one workstation to another. The transfer bar 12a is elevated to a first position for transportation of the workpiece, and is lowered to a second position when the workpiece reaches a station. The first position is illustrated in solid line in FIG. 6, and a second position is illustrated in phantom line in FIG. 6. The transfer bar 12a is operably associated with a support member 14a. The support member 14a includes a cam surface 16a with a first end 18a and a second end 20a. A cam follower 22a is engageable with the cam surface 16a for supporting the transfer bar 12a with respect to the support member 14a as the cam follower 22a moves along the cam surface 16a between the first end 18a and the second end 20a. In operation, the transfer bar 12a is in the first or raised position when the cam follower 22a is adjacent the first end 18a of the cam surface 16a. The transfer bar 12a is in the second or lowered position when the cam follower 22a is adjacent the second end 20a of the cam surface 16a. In the embodiment illustrated in FIGS. 5–6, the cam follower 22a is rotatable about a fixed stationary axis, while the cam surface 16a is formed on a movable support member 14a operably engaged and supported by the cam follower 22a. Means 24a is provided for driving the movable support member 14a and associated cam surface 16a with respect to the cam follower 22a between the first end 18a and second end 20a of the cam surface 16a. The driving means 24a can include any suitable prime mover, such as an electric motor, hydraulic motor, pneumatic motor, hydraulic cylinder, pneumatic cylinder, or other suitable substitute. The prime mover can be directly connected to the movable support member 14a, which in the embodiment illustrated in FIGS. 5–7 defines the lift truck or carriage 26a supporting the transfer bar 12 and associated cam surface 16a. Alternatively, the driving means 24 can be indirectly connected through an appropriate mechanical connection to provide the desired reciprocal motion to be imparted to the movable support member 14a or carriage 26a.

In operation, the driving means 24a is actuated to move the cam surface 16a in relation to the cam follower 22a. The driving means 24a acts on the lift truck or carriage 26a supporting the cam surface 16a and the transfer bar 12a.

Preferably, the lift truck or carriage 26a includes a slide block connection 28a to support one or more transfer bars 12a with respect to the lift truck or carriage 26a. The slide block connections 28a slidably receive one or more rails 30a allowing horizontal movement of the one or more transfer bars 12a with respect to the lift truck or carriage 26a. By way of example and not limitation, the transfer bar 12a can be moved horizontally while the lift truck or carriage 26a is in the raised position shown in solid lines in FIG. 6. The lift truck or carriage 26a is held in a raised position by the driving means 24a. When the horizontal movement of the transfer bar 12a has been completed, or as the movement approaches completion, the driving means 24a can be actuated to move the lift truck or carriage 26a from the raised position shown in solid lines in FIG. 6 to the lowered position shown in phantom line in FIG. 6. During movement of the lift truck or carriage 26a by the driving means 24a, the cam surface 16a and cam follower 22a cooperatively engage with one another during movement along the cam surface 16a formed on the support member 14a. If a straight vertical rise and fall of the workpiece is required in this particular application, the transfer bar 12a can be held in a stationary horizontal position as a lift truck or carriage 26a moves between the raised and lowered positions. Relative movement is permitted between the lift truck or carriage 26a and the transfer bar 12a through the slide block connections 28a. When the lift truck or carriage 26a approaches the second or lowered position, the carried workpiece typically has been transferred to a workstation nest or temporary workpiece transfer nest.

In some applications, it may be desirable to modify the movement of lost or acceleration, of the workpiece as the workpiece travels between the first position and the second position. A cam surface 16a can include a non-linear surface portion similar to that shown in FIGS. 3 and 4, such as a cradle or lock surface portion as illustrated in FIG. 4, or a dwell surface portion as illustrated in FIG. 3. The non-linear surface portion of the cam surface 16a can include at least one dwell surface to permit continued movement of the driving means 24a while maintaining the transfer bar 12a in a stationary elevation, or in a reduced rate of vertical velocity or acceleration. In other words, the dwell surface portion can bring the vertical velocity of the transfer bar 12a to a predetermined value, either greater than zero or equal to zero as desired for the particular application. One or more dwell surface portions can be included along the length of the cam surface 16a. The dwell surface portion can be used individually or in combination with the cradle or lock surface portion similar to that illustrated in FIG. 4.

A cradle or lock surface portion of the nonlinear surface portion of cam surface 16a can be used to maintain the transfer bar 12a in a predetermined position in the event of a failure of the driving means 24a. One or more cradle or lock surface portions can be provided along the length of the cam surface 16a and various locations where it may be desired to hold the transfer bar 12a in position in the event of a power failure to the driving means 24a. The cradle or lock surface portion can be used individually, or in combination with one or more dwell surface portions as desired. One or more cradle or lock surface portions can be provided along the length of the cam surface 16a, or adjacent to at least one end of the cam surface 16a.

As best seen in FIG. 5, the apparatus 10a can include first and second stationary bases 38a, 38b. Each base 38a, 38b can support at least a single cam follower 22a, such as that shown with respect to the second base 38b, or a plurality of cam followers 22a, such as that illustrated with respect to the first base 38a. The movable support member 14a associated with each base 38a, 38b can be independently driven by separate prime movers, or can be connected in operable engagement with one another through appropriate structure, such as members 40a, 40b. When connected with appropriate structural members, a single prime mover can be provided for reciprocating a plurality of movable support members 14a, or lift trucks or carriages 26a.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for elevating a workpiece comprising:

a transfer bar having a surface for supporting a workpiece and being moveable between a first position and a second position, the second position being offset vertically and horizontally from the first position;

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface.

2. The apparatus of claim 1 wherein the cam surface includes a non-linear surface portion.

3. An apparatus for elevating a workpiece comprising:

a transfer bar having a surface for supporting a workpiece and being moveable between a first position and a second position;

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface;

wherein the cam surface includes a non-linear surface portion; and wherein the non-linear surface portion includes a cradle surface portion to maintain the transfer bar in position in the event of a failure of the driving means.

4. The apparatus of claim 3 wherein the cradle surface portion is adjacent at least one end of the cam surface.

5. An apparatus for elevating a workpiece comprising:

a transfer bar having a surface for supporting a workpiece and being moveable between a first position and a second position;

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface;

wherein the cam surface includes a non-linear surface portion; and wherein the non-linear surface portion includes at least one dwell surface portion to permit continued movement of the driving means while maintaining the transfer bar in a stationary elevation.

6. The apparatus of claim 5 wherein the dwell surface portion is disposed between the first end and the second end of the cam surface.

7. An apparatus for elevating a workpiece comprising:

a transfer bar having a surface for supporting a workpiece and being moveable between a first position and a second position;

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface;

wherein the cam surface includes a non-linear surface portion; and wherein the non-linear surface portion further comprises:
at least one lock surface portion to maintain the transfer bar in position in the event of a failure of the driving means, and at least one dwell surface portion to permit continued movement of the driving means while maintaining the transfer bar in a stationary elevation.

8. The apparatus of claim 7 wherein the lock surface portion is adjacent at least one end of the cam surface.

9. The apparatus of claim 7 wherein the dwell surface portion is disposed between the first end and the second end of the cam surface.

10. In a multi-station machining line where at least one workpiece to be machined is transported on at least one transfer bar from one station to another, and the at least one transfer bar is elevated to a first position for transportation of the workpiece and lowered and horizontally moved to a second position when the workpiece reaches a station, the improvement comprising:

a support member having a cam surface with a first-end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface.

11. The improvement of claim 10 wherein the cam surface includes a non-linear surface portion.

12. In a multi-station machining line where at least one workpiece to be machined is transported on at least one transfer bar from one station to another, and the at least one transfer bar is elevated to a first position for transportation of the workpiece and lowered to a second position when the workpiece reaches a station, the improvement comprising:

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface;

wherein the cam surface includes a non-linear surface portion and wherein the non-linear surface portion includes a cradle surface portion to maintain the transfer bar in position in the event of a failure of the driving means.

13. The improvement of claim 12 wherein the cradle surface portion is adjacent at least one end of the cam surface.

14. In a multi-station machining line where at least one workpiece to be machined is transported on at least one transfer bar from one station to another, and the at least one transfer bar is elevated to a first position for transportation of the workpiece and lowered to a second position when the workpiece reaches a station, the improvement comprising:

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface;

wherein the cam surface includes a non-linear surface portion; and wherein the non-linear surface portion includes at least one dwell surface portion to permit continued movement of the driving means while maintaining the transfer bar in a stationary elevation.

15. The improvement of claim 14 wherein the dwell surface portion is disposed between the first end and the second end of the cam surface.

16. In a multi-station machining line where at least one workpiece to be machined is transported on at least one transfer bar from one station to another, and the at least one transfer bar is elevated to a first position for transportation of the workpiece and lowered to a second position when the workpiece reaches a station, the improvement comprising:

a support member having a cam surface with a first end and a second end;

a cam follower engageable with the cam surface for supporting the transfer bar with respect to the support member as at least one of the cam follower and the cam surface moves relative to one another between the first end and the second end of the cam surface, such that the transfer bar is in the first position when the cam follower is adjacent the first end of the cam surface, and the transfer bar is in the second position when the cam follower is adjacent the second end of the cam surface; and means for driving at least one of the cam follower and the cam surface relative to one another between the first end and the second end of the cam surface;

wherein the cam surface includes a non-linear surface portion; and wherein the non-linear surface portion further comprises:
at least one lock surface portion to maintain the transfer bar in position in the event of a failure of the driving means, and at least one dwell surface portion to permit continued movement of the driving means while maintaining the transfer bar in a stationary elevation.

17. The improvement of claim 16 wherein the lock surface portion is adjacent at least one end of the cam surface.

18. The improvement of claim 16 wherein the dwell surface portion is disposed between the first end and the second end of the cam surface.

19. In a multi-station machining line where at least one workpiece to be machined is transported on at least one transfer bar from one station to another, the improvement comprising:

a support member having a non-linear cam surface with a first end and a second end;

a cam follower engageable with the non-linear cam surface for supporting the transfer bar with respect to the support member as at least one of the cam follower and the cam surface moves relative to one another between the first end and the second end of the non-linear cam surface, such that the transfer bar is in a first position when the cam follower is adjacent the first end of the non-linear cam surface, and the transfer bar is in a second position when the cam follower is adjacent the second end of the non-linear cam surface, the second position being offset vertically and horizontally from the first position; and means for driving at least one of the cam follower and the cam surface relative to one another between the first end and the second end of the non-linear cam surface.

20. In a multi-station machining line where at least one workpiece to be machined is transported on at least one transfer bar from one station to another, the improvement comprising:

a support member having a non-linear cam surface with a first end and a second end;

a cam follower engageable with the non-linear cam surface for supporting the transfer bar with respect to the support member as at least one of the cam follower and the cam surface moves relative to one another between the first end and the second end of the non-linear cam surface, such that the transfer bar is in a first position when the cam follower is adjacent the first end of the non-linear cam surface, and the transfer bar is in a second position when the cam follower is adjacent the second end of the non-linear cam surface; and means for driving at least one of the cam follower and the cam surface relative to one another between the first end and the second end of the non-linear cam surface; and wherein the non-linear cam surface further comprises:
at least one surface portion selected from a group consisting of a lock surface to maintain the transfer bar in position in the event of a failure of the driving means, and a dwell surface to permit continued movement of the driving means while maintaining the transfer bar in a stationary elevation.

* * * * *